United States Patent Office 2,797,138
Patented June 25, 1957

2,797,138

METHOD OF INHIBITING EVAPORATION OF CRUDE OIL AND FLOATING LAYER FOR USE THEREIN

Franklin Veatch, Lyndhurst, and Everett C. Hughes, Shaker Heights, Ohio, assignors to The Standard Oil Company, Cleveland, Ohio, a corporation of Ohio No Drawing. Application October 30, 1953, Serial No. 389,471

Claims priority, application Canada March 6, 1953

8 Claims. (Cl. 21—60.5)

The present invention relates to the inhibition of the evaporation loss of crude oil and analogous products by a floating layer of small hollow hole-free particles.

The petroleum industry has long been plagued with the problem of evaporation of petroleum products stored in tanks. Attempts to minimize this loss have resulted in various proposals, none of which have proved entirely satisfactory. The shape of the storage tanks, particularly the roofs of said tanks, has been altered in an effort to reduce the evaporation loss but this has been only a partial solution due to the "breathing" effect with a change in temperature and upon filling and emptying the tank. Floating foams of myriad chemical compositions have been proposed, but with no appreciable reduction in evaporation loss, probably due to the short life of such foams. Furthermore, some of these chemical compositions have contaminated the stored petroleum products. This evaporation loss has proved exceedingly costly.

Accordingly, an object of this invention is the development of a permanent, inexpensive and effective method of substantially decreasing or inhibiting the evaporation loss from the surfaces of petroleum products, particularly crude oil or fractions containing the volatile components as well as the heavier components of crude oil.

This and other objects, as well as the utility and advantages of the invention, will become apparent from the following detailed description.

It has now been found that the evaporation loss of crude oil can be effectively decreased and inhibited by floating thereon a layer of particles which are formed from film-forming materials, are hollow, predominately hole-free, and very small. Each particle is a separate, discrete entity.

One method of preparing hollow gas-filled, hole-free particles suitable for the invention is described in co-pending application No. 383,908, filed October 2, 1953, and consists essentially in the steps of spraying a volatile vehicle containing a film-forming material capable of forming a tough gas-impermeable skin, and a gaseous substance or a gas-evolving substance, into a current of heated air, whereby the vehicle is volatilized and the film-forming material is solidified in the form of hollow particles containing the evolved gas. The gas evolved during the drying is trapped within the particle and prevents the collapse of the film wall during drying or thereafter. While the disclosure of said copending case is incorporated by reference so much of it will be repeated as is believed necessary to understand this invention.

Gases per se utilizable in the above described process include carbon dioxide, methyl chloride, ammonia, dimethyl ether, ethylene oxide, methyl amine, methyl bromide, dimethyl amine, etc. Gas evolving substances, more commonly called blowing agents, are also utilizable in the instant process. Some of the well-known blowing agents operable herein include inorganic and organic salts of carbonates, nitrites, carbamates, oxalates, formates, benzoates, sulfites, bicarbonates, such as the sodium, ammonium, calcium and magnesium, salts thereof. Organic substances such as p-hydroxy phenylazide, di-N-nitrosopiperazines, polymethylene nitrosamines such as di-N-nitrosopentamethylene tetramine and trimethylene trinitrosamine, compounds containing two or more groups of the formula $CON(alkyl)NO$, such as succin-bis-(N-nitrosomethylamide) diazoaminobenzene, diazoisobutyric acid dinitrile and homologues thereof prepared using cyclohexanone or methyl ethyl ketone instead of acetone, can also be utilized in the aforedescribed method of preparing hollow hole-free particles.

Many of the above blowing agents will react with other substances to produce gases instantaneously. Carbonates and sulfites, for example, such as sodium carbonate and sodium sulfite, react with acids such as hydrochloric or sulfuric to produce carbon dioxide and sulfur dioxide, respectively. Ammonium salts react with bases such as sodium hydroxide to liberate ammonia. Therefore, by feeding in hydrochloric acid solution to a solution of a film-forming material in accordance with the invention containing a carbonate or sulfite just as the solution is entering the atomizer, carbon dioxide or sulfur dioxide is liberated and is present during spray-drying as the gas necessary for forming hole-free hollow particles.

The amount of gas-forming substance required depends on the weight of the film-forming solution, the type and amount of gas evolved, and is usually within the range of about 0.1% to 25% by weight of the solution to be atomized.

The film-forming materials may be organic or inorganic. Organic materials include cellulose derivatives such as cellulose acetate, cellulose acetate-butyrate, and cellulose acetate-propionate, thermoplastic synthetic resins, such as polyvinyl resins, i. e.,, polyvinyl alcohol, polyvinyl chloride, copolymers of vinyl chloride and vinyl acetate, polyvinyl butyral, polystyrene, polyvinylidene chloride, acrylic resins such as polymethyl methacrylate, polyallyl, polyethylene, and polyamide (nylon) resins, and thermo-setting resins in the initial water- or organic solvent-soluble stage of partial polymerization, the resins being converted after or during formation of the particles into a more or less fully polymerized solvent-insoluble stage, such as alkyd, polysiloxane, phenol-formaldehyde, urea-formaldehyde and melamine-formaldehyde resins. All of these resins are film-forming and therefore capable of forming tough-skinned particles during evaporation of droplets of solution thereof in aqueous or organic solvents. Natural film-forming materials are also included within the scope of the form, including soybean protein, zein protein, alginates, and cellulse in solution as cellulose xanthate or cuprammonium cellulose. Inorganic film-forming substances which may be used are sodium silicates, polyborates and polyphosphates.

The solvent employed will, of course, be dictated by the solubility of the film-forming mtaerial used. The solvent should, upon evaporation, be conducive to solidification of the material, so that a tough skin is quickly formed over the surface of the droplet. Water, alcohols, ethers, esters, organic acids, hydrocarbons and chlorinated hydrocarbons are the most noteworthy satisfactory solvents.

The concentration of the film-forming material solution is not critical, the lower limit being controlled by the size of the particle since the smallest particles are formed from dilute solutions, and the upper limit being set by the viscosity of the solution and by the maximum particle size desirable. Optimum results have been obtained with solutions containing from 1 to 15% film-forming material, although concentrations up to 30% have also been found satisfactory. Solutions as dilute as 0.1% have given satisfactory results. Aqueous solutions which contain from 1% to 10% polyvinyl alcohol (viscosity of a 4% aqueous solution at 20° C. is 4 to 28 cp. by the Hoeppler falling-ball method) or from 1% to 30%, preferably 5% to 20%, phenol-formaldehyde resin, are very satisfactory.

The solution is prepared, subdivided into droplets, and dried, by conventional means. The use of spray drying equipment, in which the droplets are dried in a current of hot gas, usually air, is especially advantageous. The drying temperature is adjusted according to the stability and softening point of the film-forming material, the size of the droplets produced and the volatility of the solvent employed. However, as those skilled in the art appreciate, because of the cooling effect of evaporation, drying air of very high temperatures may be used without injury to low melting or easily decomposable materials. A high drying rate is very desirable; usually, air temperatures in the range of 80° to 700° F. will be adequate. Satisfactory drying conditions for individual cases are shown in the examples.

The dry particles that are produced in conventional spray-drying equipment, employing solutions of the concentrations indicated above, are very small. Frequently their diameter is about ten times the thickness of the plastic skin surrounding their hollow interior, but these dimensions will depend upon the droplet size produced by the equipment used and the concentration of the film-forming material in the solution.

The following examples are illustrative of the method and particle produced in accordance with said copending application.

EXAMPLE I

An aqueous solution of a water-soluble partially polymerized phenol-formaldehyde resin (Durez 15281) was prepared with a blowing agent. The composition contained 10% of the resin, 1% of di-N-nitrosopentamethylene-tetramine (on an active basis) and 89% water. This composition was spray-dried in a semi-commercial apparatus at the rate of 1 pound of solution per minute with the dryer operating at an inlet temperature of 530° F. and an outlet temperature of 425° F.

The run was repeated using the same solution and under the same conditions except that the feed rate was 3 pounds per minute. Inasmuch as the particles obtained at the two different feed rates were not substantially different, the output of the two runs were combined and their properties indicated in Table I.

EXAMPLE II

Example I was repeated except that the solution contained a smaller amount of resin and blowing agent, more particularly 2½% of the resin, ½% of the blowing agent, and 97% water. This was spray-dried in a laboratory spray-dryer at the rate of 100 cc. per minute with a dryer inlet temperature of 750° F. and a dryer outlet temperature of 450° F. The properties of the particles obtained are given in Table I.

*Table 1*

| Run Number (Example No.) | I [1] | II |
| --- | --- | --- |
| Product Properties: | | |
| Density, gm/cc.— | | |
| Bulk | 0.098 | 0.0207 |
| Liquid displacement | 0.320 | 0.1134 |
| Size, microns— | | |
| Average (Sub-sieve sizer) | 16.0 | 21.4 |
| Microscopic range | 2–30 | 5–50 |
| Flotation, estimated percent sunk in D. D. naptha in 24 hours | 4 | 1 |
| Product description | (²) | (²) |

[1] This batch is a mixture of the products from two runs. Feed rates were 1 and 3 lbs./minute, respectively. Properties given here are the average of both runs, which gave very similar products.
² Hollow spheres.

EXAMPLE III

A 10% solution of a phenol-formaldehyde resin (Durez 14798), containing 1% of ammonium carbonate as a blowing agent, with 89% water was spray-dried at a feed rate of 111 cc. per minute, with a drier operating at an inlet temperature of 700° F. and an outlet temperature of 400° F. In the flotation test only 3% of the particles were sunk after 24 hours. The particles had a liquid displacement density of 0.449, a bulk density of 0.163, and a size range (microscopic) of 2 to 30 microns.

EXAMPLE IV

Example III was repeated except that ammonium nitrite was employed as the blowing agent. The particles had a liquid displacement density of 0.353, a bulk density of 0.09, and a microscopic size of 2 to 40 microns. Only 1% was sunk after 24 hours in the flotation test.

EXAMPLE V

An aqueous solution of polyvinyl alcohol (Dupont "Elvanol" grade 70–05) in an amount of 5% was prepared with ½% ammonium carbonate as the blowing agent. The balance comprised water in the amount of 94.5%. This composition was spray-dried at the feed rate of 80 cc. per minute, at an inlet temperature of 600° F. and an outlet temperature of 270° F. The particles had a liquid displacement density of 0.192, a bulk density of 0.07, and a microscopic size range of 5 to 50 microns. Only 2% sank in the flotation test.

Following the general description and the examples given heretofore, particles formed from urea-formaldehyde resin, polystyrene, methyl cellulose and sodium silicates were prepared having bulk densities within the range of 0.05 to 0.23, and an average particle size of 2.02 to 36.5 microns.

In addition to hollow particles made by the above described process, it is possible to utilize hollow particles made by other processes in which the wall of the particle can be formed of other materials. For example, the particles may be formed from a ceramic material, such as may be made by heating clay particles at a very high temperature or by the formation of hollow hole-free glass beads. These particles will float on a liquid and can be used alone or in combination with the particles described in greater detail heretofore.

The particles used in the invention include all such very small particles of more or less spherical shape. They are predominately hole-free and will float on a liquid, irrespective of the material from which they are formed and the manner in which they are made as long as they are insoluble in and inert with respect to the materials with which they are in contact, and irrespective of the process by which they are made.

The preferred bulk density of the particles is within the range 0.01 to 0.3, and the preferred liquid displacement density is within the range of 0.05 to 0.6 (gm./cc.), preferably 0.2 to 0.5. The bulk density is of interest in transporting or storing the dry particles. The liquid displacement density is of interest when the space between the particles is to be occupied by a liquid such as in a foam.

The particles have an average diameter of 1 to about 500 microns, preferably 25 to 250 microns. Particles having a size of less than 1 micron are entirely suitable but are more difficult to manufacture.

When the particles are added to a volatile liquid they float thereon, and when present in a layer of adequate thickness, evaporation is reduced. This evaporation may be further reduced by mixing of the particles with a sealing liquid which is non-volatile and will float with the particles.

It has been discovered, in accordance with this invention, that the particles are unusually effective in preventing evaporation in crude oil without a separate sealing liquid. Apparently there are components in the crude oil which exert the function of a sealing liquid, i. e., prevent the volatile components of crude oil from passing through the layer and yet at the same time these components are such that the crust-like surface does not form, or at least is not so pronounced as to prevent satisfactory resealing upon breaking of the floating layer. It is fortuitous that the components which render the particles effective in preventing evaporation in crude oil are, in fact, components inherently present in the crude oil.

The above are only possible explanations of the action and the invention is not to be limited to any theory or explanation of the results obtained.

The floating layer of particles is formed by adding the particles to the crude oil to be protected against evaporation loss or other oil such as light neutral oil which is mxed with crude oil. The combination of the particles and the crude oil results in a floating layer which has the form of a viscous slurry, the particles constituting from about 20% to 70% by volume of the oil slurry, preferably 40% to 55%. This protective floating layer composed essentially of the particles and crude oil or a component thereof is rendered gas impermeable by virtue of the fact that the crude oil or a component thereof is held in place by capillary force between the capillary interstices of these spherical particles.

The thickness of the layer deposited on the surface of the crude oil must be sufficient to yield an effective reduction or inhibition in evaporation loss. Accordingly, drum-scale evaporation tests have shown that a one-inch layer formed from the particles and crude oil will reduce evaporation loss down to about 20–30% of the loss encountered with uncovered crude oil as shown in Table II. A part of this loss may be due to initial losses while equilibrium conditions are being formed. After the layer becomes of constant composition, the losses are less. The thickness of the layer may vary. A substantial reduction in evaporation is obtained with a layer one-eighth of an inch thick. No useful purpose is served by making the layer thicker than about 3 inches.

Another embodiment of the present invention resides in the optional addition of a smal quantity of an oil-immiscible, non-volatile lubricant for the particles, such as dispropylene glycol, in order to improve the fluidity of said layer which otherwise may tend to set over a period of time into a relatively stiff covering. The optimum amount of the lubricant used is about ½ to 4%, preferably about 2%, of the weight of the hollow particle content of the floating layer. The amount is less than which will fill all the capillary spaces. The criticality of utilizing only small quantities of dipropylene glycol is cearly shown by Table II runs G, H, and I, wherein 10, 20 and 30% dipropylene glycol resulted in extremely stiff foams which inhibited the sealing action of said floating layer. The difficulties encountered with a sealing liquid have been described previously.

It is important to retain the fluidity of the protective gas-impermeable layer in order to enable said layer to seal itself should any breaks occur. In the normal storage and withdrawal of crude oil, the covering may be broken by obstructions in the tank or otherwise, thereby exposing a portion of the crude oil surface to the atmosphere with a consequent evaporation loss. Consequently, the ability and rapidity with which the protective layer reseals itself is an essential property of a satisfactory protective layer. Although the outer surface of the floating layer may tend to set into a relatively stiff outer coating, sufficient fluidity exists underneath in accordance with the invention to enable the floating layer to flow into the crevices and seal itself from the bottom.

In order to test the results on evaporation of the floating layer of this invention, two 55-gallon open-top drums containing approximately 10 gallons of West Texas C crude oil of API gravity 33.9 floating on about 30 gallons of tap water were set up. A quantity of the particles premixed with a portion of the crude oil sufficient to give a thickness as indicated in run B in Table II was added to one drum. The two drums, one covered with a floating layer and the other completely uncovered, then stood in a small shed away from direct sunlight for a period of 18 days. Change in depth measurements were then made from which test calculations were made showing that the covered drum lost only a relatively low percent of the volatile hydrocarbon lost by the control uncovered drum. The results are shown in runs A and B of Table II. In another series of tests, designated as runs C to I in Table II, the test drums were mounted on a metal platform and connected to water input and drain by means of a manifold entering each drum about three inches from the bottom. The drums were clamp type top drums and a vent consisting of two-inch pipe and elbows was installed in each drumhead. The water manifold contained a flowmeter which permitted the determination of the rate of rise and fall of the water level in each drum.

Hydrocarbon depth measurements were then made through a small floating gage well my means of an electrical probe which determined the water level. Hydrocarbon depth was then measured directly off the probe by means of a millimeter scale. Depth measurements were made in each drum once every few days along with qualitative remarks on the sealing ability of the foam. Each time the hydrocarbon depth measurement was taken, the levels in the test drums were changed down and up by means of withdrawing and pumping in water. During this movement, the floating layer came in contact with a ridge around the drum which broke the seal and the layer also came in contact with that portion of the drum which originally was in contact with water, simulating condensation water on tank walls. In some cases, as indicated in Table II, a small quantity of 90 percent dipropylene glycol was also premixed with the floating cover.

The results were as follows:

Table II

| Runs | Floating Layer Thickness, Inches | Floating Layer Composition | Loss, mm./day (Avg. 18 day period) | Loss, gal./ 1,000 sq. ft./ day | Loss, Percent of Control | Fluidity and Sealing Remarks |
|---|---|---|---|---|---|---|
| A | None | Crude Oil Control A. P. I., Gravity 33.9. | 0.72 | 17.6 | 100 | |
| B | 0.8 | A plus particles of Example II +2 wt. percent of dipropylene glycol (90%). | 0.22 | 5.4 | 31 | A large slash made with a four inch board. Sealing appeared O. K. after test period. |
| C | None | Crude Oil Control, A. P. I. Gravity 35.7. | 1.3 | 32 | 100 | |
| D | 1.0 | C plus particles of Example II. | 0.3 | 7.4 | 23 | Stiff surface but sealing O. K. |
| E | 1.0 | C plus particles of Example I. | 0.3 | 7.4 | 23 | About same as D. |
| F | 2.0 | ......do...... | 0.5 | 12 | 37 | Stiffer than D and E. Seals O. K. but slower than E. |
| G | 1.0 | C plus particles of Example I +10 vol. percent dipropylene glycol. | 0.6 | 15 | 47 | Surface fluidity better than E. Seals O. K. but much slower than E. |
| H | 1.0 | C plus particles of Example I +20 vol. percent dipropylene glycol. | 0.7 | 17 | 53 | Fluidity slightly better than G. Seal about same. |
| I | 1.0 | C plus particles of Example I +30 vol. percent dipropylene glycol. | [1] 1.1 | 27 | 84 | So stiff that sealing doubtful from start. |

[1] Avg. of 6 day period. Test stopped at 6 days because of obvious lack of seal.

The results of the above table clearly illustrate that the floating layer is very effective in reducing the evaporation loss as shown by runs D and E. The addition of traces, such as 2%, of propylene glycol also appears satisfactory (run B), but amounts of 10% and above result in stiff floating layers incapable of rapid sealing, consequently resulting in greater evaporation losses (runs G, H and I). Increasing the density (liquid displacement) of the particles from 0.1 to 0.3 had no effect on the protective action of the floating layer prepared therefrom as clearly shown by runs D and E. Increasing the thickness of the floating layer from one inch to two inches served no useful purpose, the thicker layer in fact yielding a greater evaporation loss than the one inch layer (run F).

The above tests were confirmed by tests in the field. Two large field tanks in good condition vented to the atmosphere were employed. The tanks were filled with crude oil. One of the tanks was covered with the particles and the other was uncovered. The covering was prepared by mixing the particles with the crude oil in the proportion of one pound of particles per gallon of crude oil. This mixture was then placed inside the tank in an amount eventually to cover the entire surface of the crude oil to a depth of about ¾" with a stable layer.

At intervals of every one or two weeks throughout the entire test period of about 67 days, very careful measurement of the crude oil in each tank was made. The results of the test in terms of average evaporation loss are set forth in Table III below:

Table III

| Tank | Loss, Bbl./day | Gal./1,000 Ft.²/day |
|---|---|---|
| Control | 0.090 | 10.4 |
| Covered | 0.0126 | 1.45 |

Examination of the properties of crude oil before and after the storage in the two tanks for 56 days also showed that the contents of the control tank had changed appreciably more than in the test tank. This was indicated by a change in API gravity, density, and the 10% point in the Engler distillation. These results are shown in Table IV as follows:

Table IV

| | Initial | After 56 Days | |
|---|---|---|---|
| | | Control | Test |
| °A. P. I. | 37.7 | 36.0 | 37.6 |
| Density | 0.8362 | 0.8447 | 0.8366 |
| 10% Pt., °F | 248 | 262 | 251 |

Any suitable means of providing the surface of crude oil with a floating layer of the type hereinabove described may be employed. In very small tanks, the floating layers may be installed by simply pouring the particles on the surface of the crude oil and agitating the entire surface to secure good dispersion of the particles in the crude oil surface. However, much larger tanks are utilized in industry, rendering such a procedure less suitable. In a small tank installation it is possible to ripple the surface of the crude oil sufficiently from a gage hatch with a large paddle or possibly with a horizontal disk moved vertically with a suitable handle to sufficiently disperse and mix particles which have been poured onto the crude oil surface through the hatch. However, the usual large tanks encountered in industry may require different methods of installation. One satisfactory method involves the premixing of the particles with oil, not necessarily crude oil (for safety purposes, a light neutral oil or a reduced crude may be used), whereby a viscous slurry is obtained which is subsequently pumped onto the surface of the tank through any entry port. Still another method of installing this floating layer on the surface of crude oil includes the feeding of particles into a hopper aspirator or eductor while at the same time pumping the crude oil, either in an incoming pipe line or being circulated from the tank itself, into said aspirator or eductor, whereby the floating layer is generated as the particles and oil are passing through the pipe to the tank. These methods are merely illustrative of several specific means of installing a floating layer of the type herein described onto the surface of crude oil, and other variations and modifications thereof can be employed.

This application is a continuation-in-part of copending application Serial No. 278,496, filed March 25, 1952 (now abandoned).

We claim:

1. A method of inhibiting the evaporation of volatile components of crude oil which comprises covering the surface of said oil with a floating layer of non-volatile components of crude oil and discrete, spherical, oil-wettable, hollow, gas-filled, hole-free particles of a solid material inert to said oil, which particles have an average diameter of less than 500 microns and have a liquid displacement density less than the density of said oil, said particles occupying about 20 to 70% by volume of the floating layer.

2. A method of inhibiting the evaporation of volatile components of crude oil which comprises covering the surface of said oil with a floating layer of crude oil and discrete, spherical, oil-wettable, gas-filled, hole-free particles of a solid material inert to crude oil, which particles have an average diameter of from 25 to 250 microns and have a liquid displacement density of from 0.05 to 0.5, said particles occupying about 20 to 70% by volume of the floating layer.

3. A method of inhibiting the evaporation of volatile components of crude oil which comprises covering the surface of said oil with about a one-inch floating layer of crude oil and discrete, spherical, oil-wettable, hollow, gas-filled, hole-free particles of a solid material inert to crude oil, which particles have an average diameter of from 25 to 250 microns and have a liquid displacement density of from 0.2 to 0.5, said particles occupying about 40 to 55% by volume of the floating layer.

4. A method of inhibiting the evaporation of volatile components of crude oil which comprises covering the surface of said oil with a floating layer containing as the essential ingredients non-volatile components of crude oil and discrete, spherical, oil-wettable, hollow, gas-filled, hole-free particles of a solid material inert to crude oil, which particles have an average diameter of from 25 to 250 microns and have a liquid displacement density of from 0.2 to 0.5, said particles occupying about 40 to 55% by volume of the floating layer, said components being held in place between the interstices of said particles by capillary force.

5. A method of inhibiting the evaporation of volatile components of crude oil which comprises forming a slurry by mixing crude oil with discrete, spherical, oil-wettable, hollow, gas-filled, hole-free particles of a solid material inert to crude oil, which particles have an average diameter of less than 500 microns and have a liquid displacement density less than the density of crude oil, and applying the slurry to the top of crude oil in storage to form a floating layer in which the particles occupy about 20 to 70% by volume.

6. A composition adapted to float upon crude oil to inhibit the evaporation thereof, comprising non-volatile components of crude oil and discrete, spherical, oil-wettable, hollow, gas-filled, hole-free particles of solid material inert to crude oil, which particles have an average diameter of less than 500 microns and have a liquid displacement density less than the density of crude oil, said particles occupying about 20 to 70% by volume of said composition.

7. The composition of claim 6 in which the solid material is a phenol-formaldehyde resin.

8. The composition of claim 6 in which the solid material is a urea-formaldehyde resin.

References Cited in the file of this patent

UNITED STATES PATENTS

| | | |
|---|---|---|
| 1,394,060 | Bates | Oct. 18, 1921 |
| 1,415,351 | Howard et al. | May 9, 1922 |
| 1,415,352 | Howard et al. | May 9, 1922 |
| 1,479,790 | Davis | Jan. 8, 1924 |
| 1,985,491 | Fisher | Dec. 25, 1934 |

OTHER REFERENCES

De Ment: Abstract of application Serial No. 301, published June 30, 1953, 671 O. G. 1497.